US00RE34831E

United States Patent [19]

Lund

[11] E Patent Number: Re. 34,831

[45] Reissued Date of Patent: Jan. 17, 1995

[54] COMMUNICATION SYSTEM

[76] Inventor: Van Metre Lund, 2294 Elm Ridge Dr., Northbrook, Ill. 60062

[21] Appl. No.: 132,158

[22] Filed: Oct. 5, 1993

Related U.S. Patent Documents

Reissue of:

[64] Patent No.: 5,056,108
Issued: Oct. 8, 1991
Appl. No.: 505,239
Filed: Apr. 4, 1990

[51] Int. Cl.[6] ..... H04L 27/30

[52] U.S. Cl. ..... 375/1; 380/34; 380/48; 375/115; 375/120

[58] Field of Search ..... 375/1, 22, 115, 120; 380/34, 48; 370/9

[56] References Cited

U.S. PATENT DOCUMENTS

| | | | |
|---|---|---|---|
| 2,530,140 | 11/1950 | Atkins | 380/6 |
| 3,550,002 | 12/1970 | Shostak | 380/48 |
| 3,878,527 | 4/1975 | Rensin et al. | 375/1 X |
| 3,890,472 | 6/1975 | Fisk et al. | 370/9 |
| 3,928,813 | 12/1975 | Kingsford-Smith | 331/1 A |
| 4,032,885 | 6/1977 | Roth | 364/715.11 |
| 4,052,565 | 10/1977 | Baxter | 375/1 |
| 4,142,240 | 2/1979 | Ward | 364/717 |
| 4,234,930 | 11/1980 | Campbell | 364/724.11 |
| 4,276,652 | 6/1981 | McCalmont | 380/34 |
| 4,423,517 | 12/1983 | Danno | 375/1 |
| 4,790,009 | 12/1988 | Ishigaki | 380/9 |
| 4,852,121 | 7/1989 | Kingston | 375/1 |
| 4,912,722 | 3/1990 | Carlin | 375/1 |
| 4,941,150 | 7/1990 | Iwasaki | 375/1 |
| 4,977,578 | 12/1990 | Ishigaki | 375/1 |
| 5,090,024 | 2/1992 | VanderMey | 375/1 |
| 5,093,841 | 3/1992 | Vancraeynest | 375/1 |

FOREIGN PATENT DOCUMENTS 0-084967 1/1983 European Pat. Off. ..... H04K 1/00

OTHER PUBLICATIONS

Taub, H. and Schilling, D. L.; "Principles of Communication Systems"; McGraw-Hill, New York, pp. 729, 741, FIGS. 5-2, 7-1; 1986.

Simon et al., *Spread Spectrum Communications,* (Computer Science Press, Inc.; 1985; pp. 1-15, 40-47, 63-71, 76-82, 98-101, & 123-134).

*Primary Examiner*—Bernarr E. Gregory

[57] ABSTRACT

In a spread spectrum communication system, sequence signals are developed in both a transmitter and receiver, in each case being derived from a clock signal through digital count-down and logic circuitry including a programmable counter which receives control number defining groups of signals from a memory under control of an indexing counter. A sequence signal in the transmitter is applied through a filter to produce a filtered signal which is propagated as a sequence of variations of alternating polarity with predetermined varying durations occurring in a predetermined distinctive order. A received signal and sequence signal of the same form as in the transmitter are applied to a product detector the output of which is applied to an integrator. Loop circuitry is provided for synchronizing the generation of the sequence signal in the receiver with that in the transmitter. A plurality of channels may be provided, using common synchronizing and other circuitry.

30 Claims, 3 Drawing Sheets

COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a communication system and more particularly to a communication system which uses a distribution of propagated energy over a wide frequency spectrum in a manner such as to obtain reliable operation while minimizing interference with propagation of other signals. The system is readily implemented through the use of digital circuitry and is otherwise readily and economically manufacturable.

2. Background of the Prior Art

The prior art includes disclosures of various type of spread spectrum communication systems which, so far as is known, appear to be quite complicated and expensive and of questionable reliability.

SUMMARY OF THE INVENTION

This invention was evolved with the general object of providing an improved communication system in which propagated energy is distributed over a wide range of frequencies in a manner such as to obtain reliable communication while minimizing interference with other communications in a medium.

The system is usable for propagation of radio waves through the atmosphere but may be used for propagation [or] *of* other types of waves through the same or another medium.

In accordance with the invention, wavetrains are propagated from a transmitting point to a receiving point, each wavetrain comprising a sequence of alternations having predetermined varying durations and propagated in a predetermined distinctive order. Energy received at a receiving point is sampled at sampling times having durations and an order corresponding to the predetermined varying durations of the transmitted wavetrains.

Important features of the invention relate to the use of digital circuitry for establishing the durations and sequence of the propagated wavetrains and also of the sampling operation, to synchronization of sampling at the receiving point with the generation of the propagated wavetrains and to provisions for simultaneous transmission on a plurality of channels.

This invention contemplates other objects, features and advantages which will become more fully apparent from the following detailed description taken in conjunction with the accompanying drawings.

DESCRIPTION OF PREFERRED EMBODIMENTS

Figure 1:
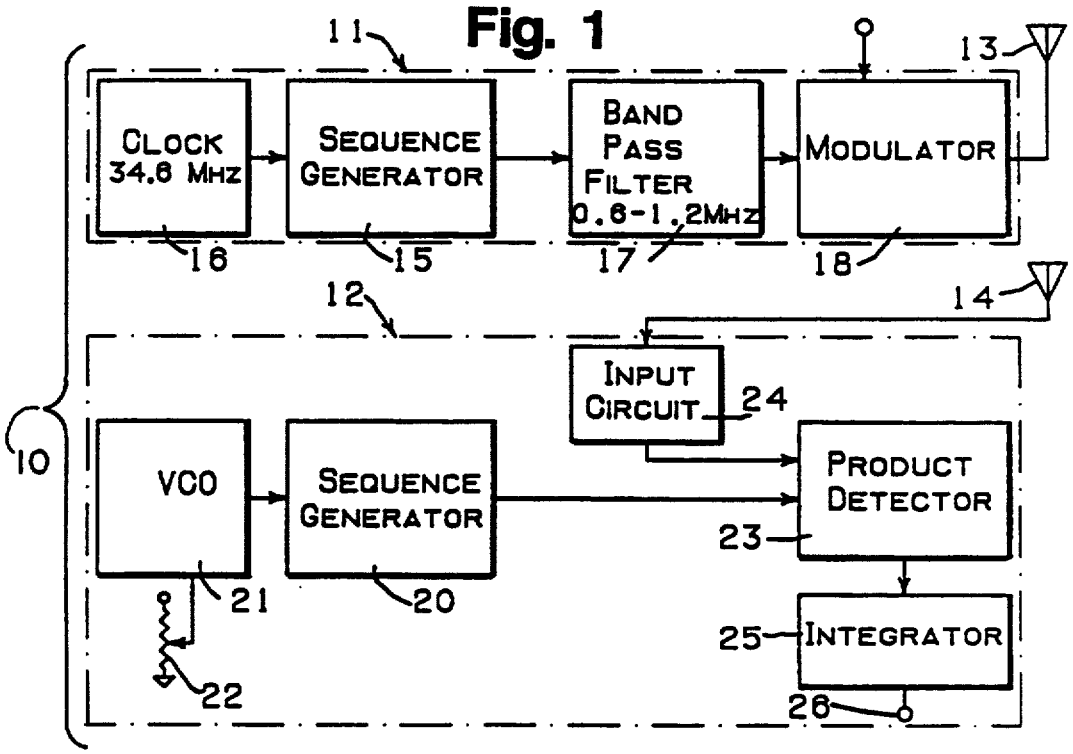
FIG. 1 is a schematic block diagram of a communication system constructed in accordance with the invention.

Reference numeral 10 generally designates a communication system which is constructed in accordance with the principles of this invention and which includes a transmitter 11 and a receiver 12 which may be connected to antennas 13 and 14 as shown for transmission of signals therebetween.

The transmitter 11 comprises a sequence generator 15 supplied with signals from a clock 16 and operative to generate sequences of signals having fundamental frequency components distributed across a certain frequency range, e.g. from 600 to 1200 [Hz] *KHz*. The signal sequences are applied through a band-pass filter 17, which passes on the fundamental components, and through an amplitude modulator 18 to the antenna 13. The amplitude modulator 18 may be responsive to a relatively low frequency analog or digital signal such as an audio signal or a digital signal having a bit rate of 2400 bits per second or less.

The receiver 12 comprises a sequence generator 20 which may be substantially identical to the sequence generator 15. It is supplied with a clock signal from a voltage controlled oscillator 21 which is controlled by a voltage from a potentiometer 22. A product detector 23 has one input connected through an input circuit 24 to antenna 14, a second input connected to the output of the sequence generator 20 and an output connected through an integrator circuit 25 to an output terminal 26. When the potentiometer 22 is properly adjusted, an output signal is developed at the terminal 26 which corresponds to the digital or analog signal applied to the modulator 18 of the transmitter 11.

Figure 2:
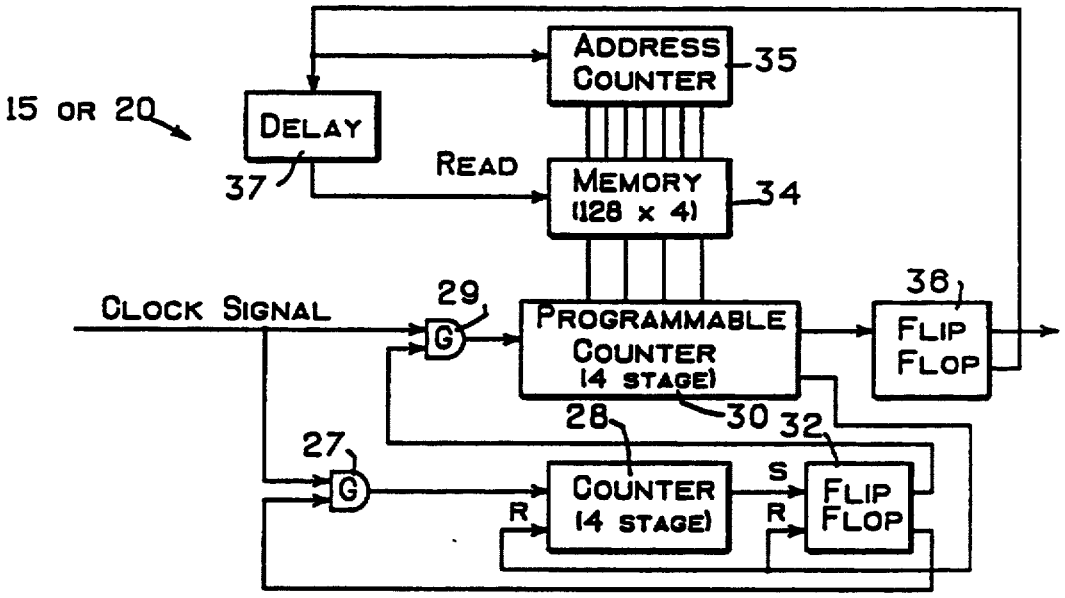
FIG. 2 is a schematic block diagram of a sequence generator usable in both transmitting and receiving portions of the system of FIG. 1.

FIG. 2 shows a circuit usable for the sequence generator 15 of transmitter 11 and for the sequence generator 20 of the receiver 12. A clock signal, from clock 16 or the voltage controlled oscillator 21, is applied through a gate 27 to a four stage counter 28 and through gate 29 to a four stage programmable counter 30. The gate 27 is enable in a reset condition of a control flip-flop to apply clock pulses to the counter 28 and after 16 pulses, the counter 28 sets the flip-flop 32 to disable gate 27 and enable gate 29 and to then apply clock pulses to the programmable counter 30. After a count of from 1 to 16 pulses, the counter 30 applies a reset signal to the flip-flop 32 as well as to the counters 28 and 30.

The total number of pulses required to develop an output from counter 30 is from 17 to 32, depending upon the number loaded therein. This number is controlled from member 34 which may be a 128×4 memory, for example, connected to a seven stage address counter 35. The address counter 35 is indexed after every other output of counter 30 by a signal from a flip-flop 36 which operates as a divide-by-two stage and which also generates output signals. After indexing of the address counter 35, a read signal is applied through a delay circuit 37 to the memory 34.

With this arrangement, the flip-flop 36 develops an output signal which is of one value, e.g. high, for from 17 to 32 clock pulses depending upon the number at one address location in the memory 34, and which is of a second value, e.g. low, for the same number of clock pulses. Then the address counter 34 is indexed to load another number in the programmable counter 30. Thus from 34 to 64 clock pulses are required for each cycle of operation of the flip-flop 36.

If all address locations of memory 34 contained the same number, any number from 0 to 15 (decimal), and if the clock signal frequency is 38.4 MHz, the flip-flop 36 would be operative to generate a square wave at a certain fixed frequency of from 1.1294 to 0.6 MHz. However, in the sequence generators 15 and 20 of the illustrated embodiment, the locations in memory 36 contain various values such as to operate to generate signals which have frequency components distributed over the 0.6 to 1.2 MHz range. Preferably, each group of sixteen consecutive memory locations contains values from 0 to 15 (decimal), with no two locations in the same group containing the same value. As an example, the first group contains value as indicated in the following Table I which also shows the cumulative total of clock pulse at each transition time.

TABLE I

| Number in Memory (decimal) | Number plus 16 | Cumulative Total |
|---|---|---|
| 8 | 24 | 24 |
| | | 48 |
| 12 | 28 | 76 |
| | | 104 |
| 11 | 27 | 131 |
| | | 158 |
| 13 | 29 | 187 |
| | | 216 |
| 6 | 22 | 238 |
| | | 260 |
| 10 | 26 | 286 |
| | | 312 |
| 4 | 20 | 332 |
| | | 352 |
| 2 | 18 | 370 |
| | | 388 |
| 5 | 21 | 409 |
| | | 430 |
| 1 | 17 | 447 |
| | | 464 |
| 0 (full count) | 32 | 496 |
| | | 528 |
| 7 | 23 | 551 |
| | | 574 |
| 15 | 31 | 605 |
| | | 636 |
| 14 | 30 | 666 |
| | | 696 |
| 3 | 19 | 715 |
| | | 734 |
| 9 | 25 | 759 |
| | | 784 |

The other seven groups of sixteen four-bit memory locations may preferably also contain values of from 0 to 15, but in orders which are different from the order of the first group and from one another. Each group requires 784 clock pulses regardless of the order of the values.

Figure 3:
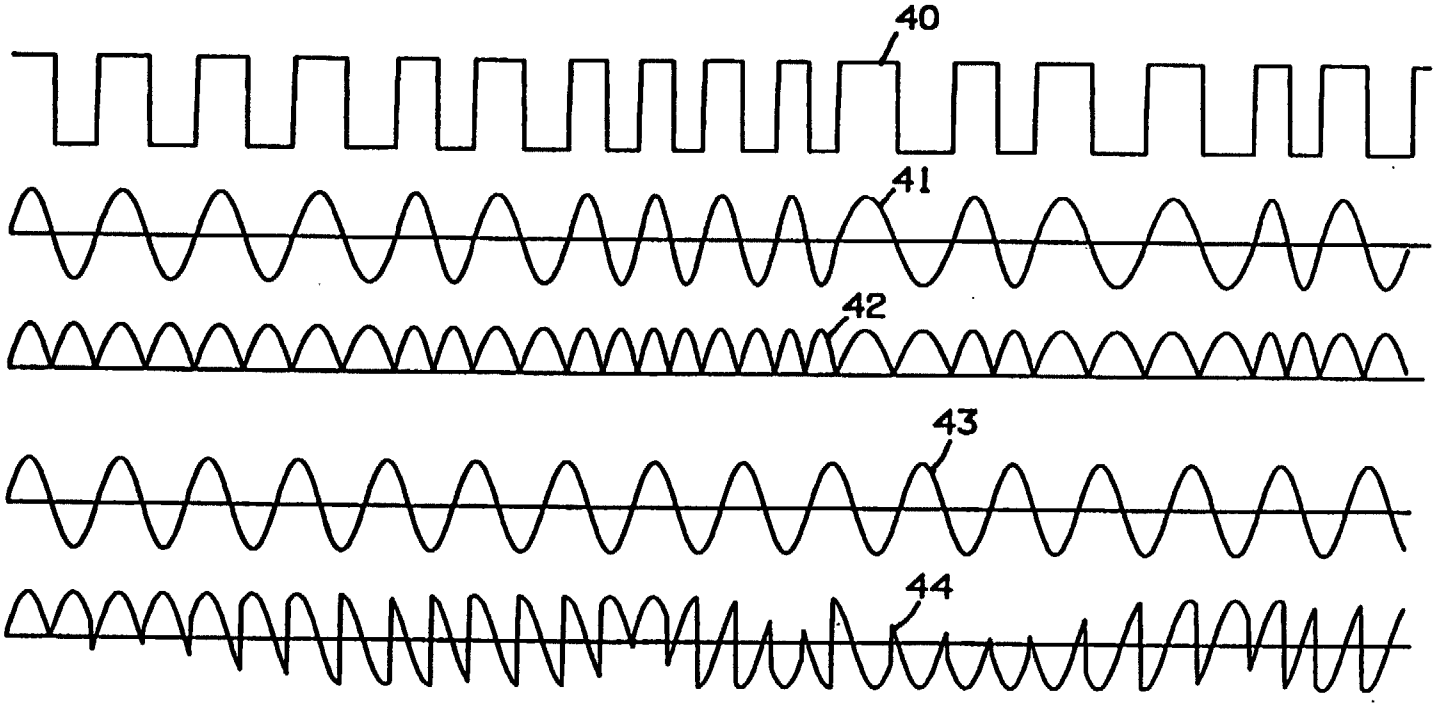
FIG. 3 illustrates waveforms produced in operation of the system, for explanation thereof.

FIG. 3 is a timing diagram in which waveform 40 is that of the signal generated by the sequence generator 15 of the transmitter 11 in response to reading of the first group of sixteen memory locations as listed in Table I.

Waveform 41 is that at the output of the band-pass filter 17, after removal of DC components and components having a frequency above 1.2 MHz. The transmitted signal has the same waveform, but may be changed in amplitude in accordance with an analog or digital signal applied to the modulator 18

The received waveform may be identical to waveform 41, under ideal conditions, and is applied through the input circuit 24 to one input of the product detector 23. Input circuit 24 may simply be a direct coupling but preferably includes a band-pass filter having a pass band from 0.6 to 1.2 MHz, an amplifier and suitable automatic gain control circuitry to limit the amplitude of the signal applied to the one input of the product detector 23.

The voltage controlled oscillator 21 is controlled by adjustment of the potentiometer 22 to cause the sequence generator 20 of the receiver to apply a signal to the second input of the product detector 23 which has a waveform identical to the waveform 41, identical values being stored in the memories of the sequence generators 15 and 20. As a result, the product detector 23 produces a signal having a waveform 42 as shown in FIG. 3, which is the product of waveforms 40 and 41.

For comparison purposes, a waveform 43 is shown which is that of a signal having a fixed frequency of 0.864 MHz and a waveform 44 is shown which is the product of waveforms 40 and 43. Waveform 44 fluctuates between positive and negative values and the sum thereof over any substantial interval of time is zero or very nearly so. Waveform 42, on the other hand, is always positive and the sum thereof over any interval of time is a positive value proportional to the duration of the time interval. The integrator 25 operates to sum or integrate the output of the product detector over a time interval which is as long as possible while permitting variations in response to amplitude modulations to be detected. It may comprise a simple series resistor and parallel capacitor combination with a time constant of on the order of 100 microseconds, for example.

Proper operation of the system shown in FIGS. 1–3 requires that the transmitter clock 16 and receiver oscillator 21 be very stable and also requires very careful adjustment of the potentiometer to obtain exact synchronization. To avoid the need for stable circuits and adjustment, synchronizing signals might be sent separately. For example, a 34.6 MHz carrier modulated by sync pulses at a 6272 rate might be transmitted to be detected at the receiver, with the received 34.6 MHz carrier being used to develop the clock signal and with detected sync pulses being used to rest the sequence generator of the receiver.

Figure 4:
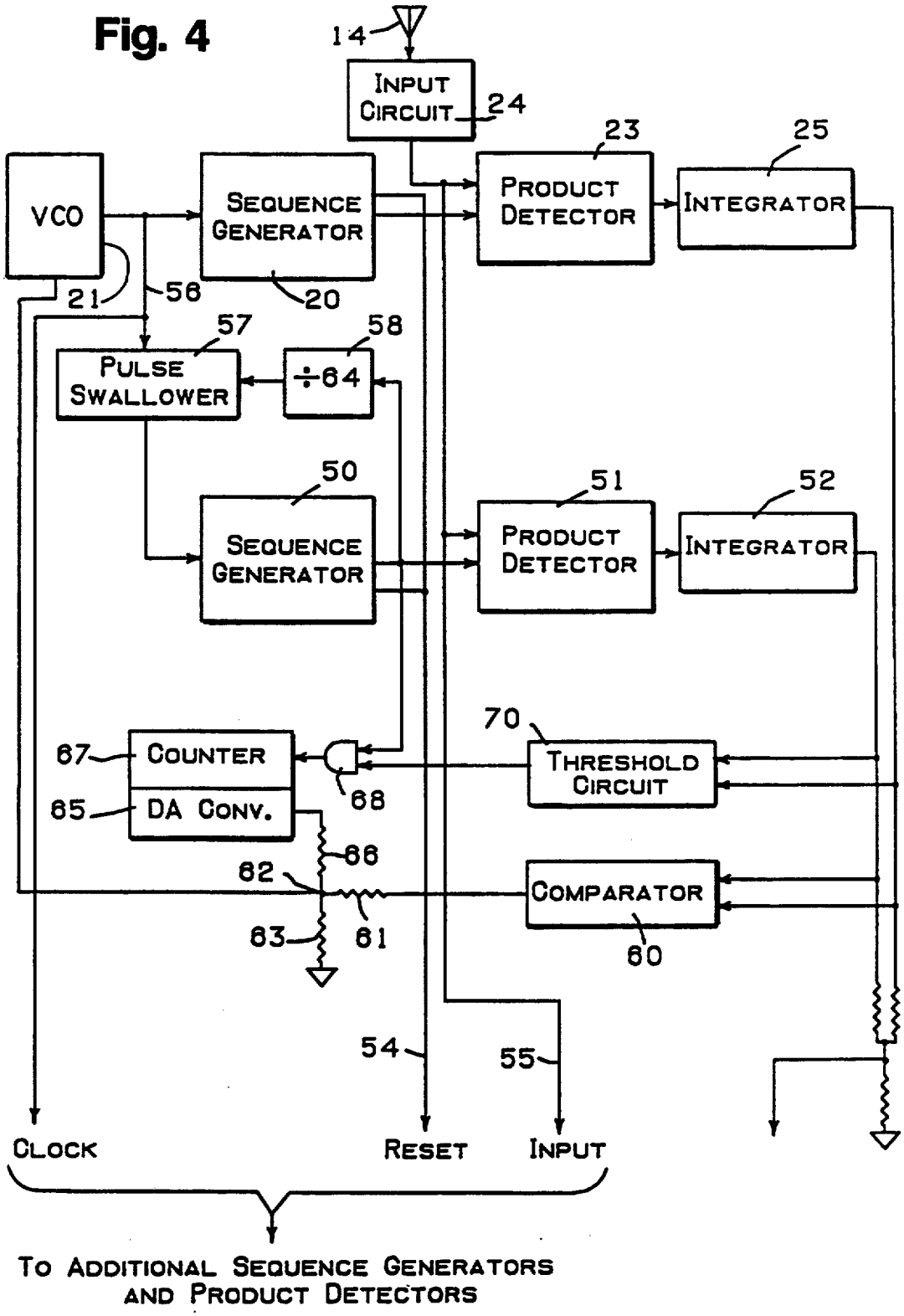
FIG. 4 is a block diagram of an alternative synchronizing system, also showing how a single receiver might be used to provide a plurality of communication channels.

An alternative synchronizing system is shown in FIG. 4 which also shows how a single receiver might be used to provide a plurality of communication channels. As shown, an additional sequence generator 50 is provided together with an associated product detector 51 and integrator 52. A reset signal is developed upon reset of the address counter of the sequence generator 20 and is applied through a reset line 54 to the sequence generator 50 to reset its address and other counters. A signal from the input circuit is applied through a line 55 to the product detector 51. A clock signal from oscillator 21 is applied through a line 56 and a pulse-swallower 57 to the sequence generator 50, the pulse-swallower 57 being operated from a divide-by-64 counter 58 connected to the output of the sequence generator 50.

Sequence generator 50 is thus operated at a clocking frequency which is slightly slower than that of the sequence generator, while being reset at the same time, and the values stored in its memory are identical to those in the memory of the sequence generator 20. Assuming that the reset of the sequence generators 20 and 50 is synchronized with that of the sequence generator 15 of the transmitter, the output of the integrator 52 will be equal to that of the integrator 25 when the transmitting clock frequency is midway between the frequency of the VCO applied to the generator 20 and the slightly lower frequency applied to the sequence generator 50 from the pulse-swallower 57. If under such conditions, the VCO frequency increases, the output of the integrator 52 will increase and the output of the integrator 25 will decrease. In the system as shown, such outputs are applied to a comparator 60 which applies an output signal through a resistor 61 to a circuit point 62 which is connected to the VCO 21 and also through a resistor 63 to ground. The polarity of the signal applied is such as to adjust the VCO frequency toward a frequency which produces the balanced condition.

This balancing operation requires that the VCO frequency be relatively close to the optimum frequency. To insure that this condition will be reached, a searching operation is performed through a D/A converter 65 which is connected through a resistor 66 to the circuit point 62 and which is connected to a counter 67 driven through a gate 68 from the output of the sequence generator 50. The result is the application of a triangular stepped voltage through resistor 66 to the circuit point 62 to cause the VCO frequency to slowly sweep in small steps through a certain range. When the frequency is close to the optimum value, to produce relatively high outputs from the integrators 25 and 52, a threshold circuit 70 applies a disabling signal to the gate 68, after which the VCO is controlled from the output voltage of the comparator 60 superimposed upon the output from the D/A converter 65.

As indicated in FIG. 4, the reset, input and clock signals on lines 54, 55 and 56 may be applied to additional integrators to produce additional output signals. The memories of such additional generators may contain values different from the values in generators 20 and 50, and from each other, to thus provide such additional independent channels as may be desired. For example, 8 additional channels may be provided for "parallel" transmission of digital data between the data bus of an 8 bit processor and a printer, modem or other peripheral.

It will be understood that modifications and variations may be effected without departing from the spirit and scope of the novel concepts of this invention

What is claimed is:

1. A method of communication, comprising the steps of operating at a transmitting point to propagate a wavetrain [into a medium] *for reception at a receiving point remote from said transmitting point*, said wavetrain including a sequence of variations each variation having one polarity during an initial phase of the variation of the sequence of variations of the wavetrain and an opposite polarity during a final phase of the variation of the sequence of variations of the wavetrain, said variations having predetermined varying durations and being in a predetermined distinctive pseudo-random order, and operating at [a] *said* receiving point remote from said transmitting point [in said medium] to develop a received signal from ambient wave energy at said receiving point, and sampling said received signal in a sampling sequence to produce samples therefrom, and summing said samples to develop an output signal therefrom, said sampling sequence including sampling times having durations and an order corresponding to said predetermined varying durations and said predetermined distinctive order of said sequence of propagated variations.

2. A method of communication as defined in claim 1, wherein said sampling of said received signal is performed during times corresponding to both of said initial and final phases of each of said variations of the sequence of variations of the wavetrain of opposite polarities to produce two samples from each variation, and wherein said two samples are added together in producing said output signal after a reversal of polarity of one of said two samples relative to the other.

3. A method of communication as defined in claim 2, wherein in sampling of said received signal a sampling signal is generated having a form corresponding to that of said propagated wave train and wherein said output signal is developed as the product of said received signal and said sampling signal.

4. A method of communication as defined in claim 1, wherein said wavetrains are repetitively propagated, the step of repeating said sampling sequence at said receiving point in synchronism with the propagated sequence.

5. A method of communication comprising the steps of operating at a transmitting point to propagate a wavetrain [into a medium] *for reception at a receiving point remote from said transmitting point*, said wavetrain including a sequence of alternations which have predetermined varying durations and are in a predetermined distinctive order, and operating at [a] *said* receiving point remote from said transmitting point [in said medium] to develop a received signal from ambient wave energy at said receiving point, sampling said received signal in a sampling sequence including sampling times having durations and an order corresponding to said predetermined varying durations and said predetermined distinctive order of said sequence of propagated alternations, and synchronizing sampling of said received signal with the propagation of said sequence of alternations by providing a delay in start of each sampling sequence in proportion to the time required for propagation of energy from said transmitting point to said receiving point.

6. A method of communication as defined in claim 5, wherein said synchronizing of sampling is achieved by sampling said received signal in said sampling sequences while continuously adjusting the start of said sampling sequences to produce a delay at which a maximum output is obtained.

7. A method of communication comprising the steps of operating at a transmitting point to propagate a wavetrain [into a medium] *for reception at a receiving point remote from said transmitting point*, said wavetrain including a sequence of alternations which have predetermined varying durations and are in a predetermined distinctive order, and operating at [a] *said* receiving point remote from said transmitting point [in said medium] to develop a received signal from ambient wave energy at said receiving point, and sampling said received signal in a sampling sequence including sampling times having durations and an order corresponding to said predetermined varying durations and said predetermined distinctive order of said sequence of propagated alternations, wherein a plurality of wavetrains are simultaneously propagated each including a sequence of alternations having predetermined varying durations and in a predetermined distinctive order but with the predetermined distinctive order of each wavetrain being substantially different from that of each other wavetrain, and wherein said received signal is sampled at sampling times in a plurality of sequences each corresponding to the sequence of a corresponding one of said plurality of propagated sequences with a plurality of output signals being produced from said sampling in said plurality of sequences.

8. A communication system, comprising transmitter means for operating at a transmitting point to propagate a wavetrain [into a medium] *for reception at a receiving point remote from said transmitting point*, said wavetrain including a sequence of variations each variation having one polarity during an initial phase of the variations of the sequence of variations of the wavetrain and an opposite plurality during a final phase of the variation of the sequence of variations of the wavetrain, said variations having predetermined varying durations and being in a predetermined distinctive pseudo-random order, and receiver means for operating at [a] *said* receiving point remote from said transmitting point [in said medium] and including means to develop a received signal from ambient wave energy at said receiving point, and sampling means for sampling said received signal in a sampling sequence to produce samples therefrom, and summing said samples to develop an output signal therefrom, said sampling sequences including sampling times having durations and an order corresponding to said predetermined varying durations and said predetermined distinctive order of said sequence of propagated variations.

9. A communication system as defined in claim 8, wherein said receiver means includes sampling signal generator means for generating a sampling signal having a form corresponding to that of said propagated wave train, and detector means for developing an output signal from said received signal and said sampling signal.

10. A communication system as defined in claim 8, wherein said sampling means includes means for sampling of said received signal during times corresponding to both of said initial and final phases of each of said variations of the sequence of variations of the wavetrain of opposite polarities to produce two samples from each variation, and wherein said receiver means includes means for adding said two samples together in producing said output signal after a reversal of polarity of one of said two samples relative to the other.

11. A communication system as defined in claim 10, wherein said receiver means includes sampling signal generator means for generating a sampling signal having a form corresponding to that of said propagated wave train, and product detector means for developing an output signal as the product of said received signal and said sampling signal.

12. A communication system as defined in claim 8, wherein said transmitter means includes means for repetitively propagating said wavetrains, and wherein said receiver means includes means for repeating said sampling sequence at said receiving point in synchronism with the propagated sequence.

13. A communication system, comprising transmitter means for operating at a transmitting point to propagate a wavetrain [into a medium] *for reception at a receiving point remote from said transmitting point*, said wavetrain including a sequence of alternations which have predetermined varying durations and are in a predetermined distinctive order, and receiver means for operating at [a] *said* receiving point remote from said transmitting point [in said medium] and including means to develop a received signal from ambient wave energy at said receiving point, and sampling means for sampling said received signal in a sampling sequence including sampling times having durations and an order corresponding to said predetermined varying durations and said predetermined distinctive order of said sequence of propagated alternations, wherein said transmitter means includes means for repetitively propagating said wavetrains, wherein said receiver means includes means for repeating said sampling sequence at said receiving point in synchronism with the propagated sequence, and wherein said [transmitter] *receiver* means includes synchronizing means for synchronizing sampling of said received signal with the propagation of said sequence of alternations by providing a delay in start of each sampling sequence in proportion to the time required for propagation of energy from said transmitting point to said receiving point.

14. A communication system as defined in claim 13, wherein said synchronizing means includes means for sampling said received signal in said sampling sequences while measuring the output and continuously adjusting the start of said sampling sequences to produce a delay at which a maximum output is obtained.

15. A communication *system*, comprising transmitter means for operating at a transmitting point to propagate a wavetrain [into a medium] *for reception at a receiving point remote from said transmitting point*, said wavetrain including a sequence of alternations which have predetermined varying durations and are in a predetermined distinctive order, and receiver means for operating at [a] *said* receiving point remote from said transmitting point [in said medium] and including means to develop a received signal from ambient wave energy at said receiving point, and sampling means for sampling said received signal in a sampling sequence including sampling times having durations and an order corresponding to said predetermined varying durations and said predetermined distinctive order of said sequence of propagated alternations, wherein said transmitter means includes means for simultaneously [transmitting] *propagating* a plurality of wavetrains [propagated] each including a sequence of alternations having predetermined varying durations and in a predetermined distinctive order but with the predetermined distinctive order of each wavetrain being substantially different from that of each other wavetrain, and wherein said receiver means includes means for sampling said received signal at sampling times in a plurality of sequences each corresponding to the sequence of a corresponding one of said plurality of propagated sequences, and means for producing a plurality of output signals from said sampling in said plurality of sequences.

16. In a spread spectrum communication system, sequence signal generator means comprising: programmable counter means for developing a control signal after a number of input pulses are applied thereto which correspond to *a* control number defining group of signals applied thereto, pulsing means for supplying input pulses to said programmable counter means, memory means coupled to said programmable counter means and containing a sequence of control number defining groups of signals for application to said programmable counter means, and memory indexing means for controlling said memory means to apply to said programmable counter means a next consecutive group of said sequence of control number defining groups of signals.

17. In a system as defined in claim 16, flip-flop means having first and second stable states and responsive to control signals developed by said programmable counter means to be switched to an opposite state in response to each control signal, and means coupling said flip-flop means to said memory indexing means to index said memory means only in response to switching of said flip-flop means from said first state to said second state.

18. In a system as defined in claim 16, said pulsing means comprising clock means for supplying a clock signal, and gating means arranged to apply said clock signal to said programmable counter means until development of said control signal and to then inhibit application of said clock signal to said programmable counter means for a time interval of substantially fixed duration.

19. In a system as defined in claim 16, said memory indexing means comprising address pulse counter *means* responsive to input pulses applied thereto and coupled to said memory means [to apply] *for indexing of said memory means to allow sequential application of* said control number defining groups *of signals from said memory means to said programmable counter means*, and means for applying pulses to said address pulse counter means and read signals to said memory means in timed relation.

20. In a spread spectrum communication system, sequence signal generator means including a clock means for supplying a clock signal at a substantially fixed frequency, and digital count-down and logic circuitry responsive to said clock signal and arranged for developing a cyclic output signal which during each cycle thereof in at one level for a time interval equal said fixed frequency divided by an integer control number and then at a second level for a time interval equal to said fixed frequency divided by the same integer control number, said integer control number being changed from one cycle to the next to produce cycles of predetermined varying durations and in a predetermine distinctive order.

21. In a spread spectrum communication system as defined in claim 20, wherein said integer control number is changed throughout a range from a minimum control number value to a maximum control number value, said system further comprising filter means responsive to said cyclic output signal to develop a filtered output signal by attenuating signal components at frequencies above a frequency which corresponds to the reciprocal of the duration of a cycle produced with said minimum integer number value, and signal propagating means responsive to said filtered output signal.

22. In a spread spectrum communication system as defined in claim 20, said system further comprising input circuit means responsive to propagated signals to develop an input signal, and product detector means responsive to said input signal and to said cyclic output signal.

*23. A method of communication as defined in claim 1, wherein each wavetrain is propagated in unmodified form from said transmitting point to said receiving point.*

*24. A communication system as defined in claim 8, wherein each wavetrain is propagated in unmodified form from said transmitting point to said receiving point.*

*25. A method of communication as defined in claim 1, wherein each phase of one polarity of each of said sequences of variations is followed by a phase of an opposite polarity and of substantially the same amplitude and duration.*

*26. A communication system as defined in claim 8, wherein each phase of one polarity of each of said sequences of variations is followed by a phase of an opposite polarity and of substantially the same amplitude and duration.*

*27. A transmitter for operation at a transmitting point to propagate wavetrains for reception by a receiver which includes means for developing samples from a received signal developed from ambient wave energy at a remote receiving point and which includes means for summing said samples, said samples being developed by said receiver in a sampling sequence including sampling times which have predetermined varying durations and which are in a predetermined distinctive order, said transmitter means comprising means for propagating each of said wavetrains in the form of a sequence of variations each variation having one polarity during an initial phase of the variation and an opposite polarity during a final phase of the variation of the sequence of variations, said variations having predetermined varying durations which are the same as said predetermined varying durations of said sampling times of said receiver and having a predetermined distinctive order which is the same as said predetermined distinctive order of said sampling times of said receiver.*

*28. A receiver for operation at a point remote from a transmitting point at which wavetrains are propagated each propagated wavetrain including a sequence of variations each variation having one polarity during an initial phase of the variation of the sequence of variations of the wavetrain and an opposite polarity during a final phase of the variation of the sequence of variations of the wavetrain, said variations of each wavetrain having predetermined varying durations and being in a predetermined distinctive psuedo-random order, said receiver comprising means for operating at said receiving point remote from said transmitting point and including means to develop a received signal from ambient wave energy at said receiving point, means for sampling said received signal in a sampling sequence to produce samples therefrom, and means for summing said samples to develop an output signal therefrom, said sampling sequence including sampling times having durations and an order corresponding to said predetermined varying durations and said predetermined distinctive order of said sequence of propagated variations.*

*29. A receiver for operation at a point remote from a transmitting point at which a plurality of wavetrains are simultaneously propagated each propagated wavetrain including a sequence of variations, each variation having one polarity during an initial phase of the variation of the sequence of variations of the wavetrain and an opposite polarity during a final phase of the variation of the sequence of variations of the wavetrain, said variations of each wavetrain having predetermined varying durations and being in a predetermined distinctive psuedo-random order but with the predetermined distinctive psuedo-random order of variations of each wavetrain being substantially different from that of each other wavetrain, said receiver comprising means for operating at said receiving point remote from said transmitting point and including means to develop a received signal from ambient wave energy at said receiving point, a plurality of sampling means each operative for sampling said received signal in a sampling sequence to produce samples therefrom, and a plurality of means for summing said samples produced by said plurality of sampling means to develop a plurality of output signals, said sampling sequences of said plurality of sampling means having said predetermined varying durations of said variations of said propagated wavetrains and having said substantially different predetermined distinctive psuedo-random orders of said variations of said propagated wavetrains.*

*30. A receiver as defined in claim 29, further comprising synchronizing means for measuring one of said output signals while adjusting starting times of said plurality of sampling means to produce a maximum amplitude of said one of said output signals.*

* * * * *